US012782979B2

(12) United States Patent
Wu et al.

(10) Patent No.: US 12,782,979 B2
(45) Date of Patent: Nov. 3, 2026

(54) PULSATION CONTROL DEVICE

(71) Applicant: Koge Micro Tech Co., Ltd, New Taipei City (TW)

(72) Inventors: Yuan-Guang Wu, New Taipei City (TW); Bo-Cheng Huang, New Taipei City (TW)

(73) Assignee: KOGE MICRO TECH CO., LTD, New Taipei City (TW)

( * ) Notice: Subject to any disclaimer, the term of this patent is extended or adjusted under 35 U.S.C. 154(b) by 74 days.

(21) Appl. No.: 18/779,052

(22) Filed: Jul. 21, 2024

(65) Prior Publication Data

US 2025/0251746 A1 Aug. 7, 2025

Related U.S. Application Data

(60) Provisional application No. 63/550,150, filed on Feb. 6, 2024.

(51) Int. Cl.
*G05D 16/00* (2006.01)
*B60R 21/26* (2011.01)

(52) U.S. Cl.
CPC ............ *G05D 16/024* (2019.01); *B60R 21/26* (2013.01); *B60R 2021/26094* (2013.01)

(58) Field of Classification Search
CPC .......... B60R 21/26; B60R 2021/26094; B60N 2/914; B60N 2/976; G05D 16/024; G05D 7/0688
See application file for complete search history.

(56) References Cited

U.S. PATENT DOCUMENTS

| | | | | |
|---|---|---|---|---|
| 5,127,708 | A * | 7/1992 | Kishi | A61B 5/18 297/284.6 |
| 5,135,282 | A * | 8/1992 | Pappers | A61H 9/0078 297/284.6 |
| 7,267,404 | B2 * | 9/2007 | Kern | F16K 11/0716 297/284.6 |
| 10,220,756 | B2 * | 3/2019 | Onuma | A61H 23/04 |
| 10,369,074 | B2 * | 8/2019 | Oberg | A61H 9/0078 |
| 10,457,180 | B2 * | 10/2019 | Bauer | B60N 2/0248 |
| 10,492,979 | B2 * | 12/2019 | Norman | A61H 9/0078 |
| 10,882,430 | B2 * | 1/2021 | Uno | B60N 2/914 |
| 2020/0368092 | A1 * | 11/2020 | Dörfler | B60N 2/914 |

* cited by examiner

*Primary Examiner* — Eric Keasel
(74) *Attorney, Agent, or Firm* — Li & Cai Intellectual Property Office

(57) ABSTRACT

A pulsation control device includes a fluid supply module, a switching unit, a first path, a second path, and a fluid receiving device. The fluid supply module outputs fluid according to a pulsation signal and a flow rate. The first path is connected between the fluid supply module and the switching unit. The second path is connected between the switching unit and the fluid receiving device. The fluid receiving device can receive the fluid outputted from the fluid supply module. The switching unit controls a state of open or closed between the first path and the second path. When the fluid supply module supplies gas to the first path for pressurizing the gas volume of the first path, the pressurized gas volume is instantly released to the fluid receiving device through the second path, so that the volume in the fluid receiving device changes.

7 Claims, 5 Drawing Sheets

PULSATION CONTROL DEVICE

CROSS-REFERENCE TO RELATED PATENT APPLICATION

This application claims the benefit of priority to U.S. Provisional Application No. 63/550,150, filed on Feb. 6, 2024. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a pulsation control device, and more particularly to a device allowing pneumatic adjustment of a fluid receiving device, such as one or more air bags.

BACKGROUND OF THE DISCLOSURE

Generally, massage devices use motors to drive rollers for exerting different forces. This type of massage device requires complex motors, gears and various rollers. Additionally, hard rollers struggle to provide a soft pressing effect.

In addition, in existing devices that utilize air pressure adjustment, such as hospital beds, the air bag can only be slowly adjusted to one state and then be fixed in that state, making the device incapable of providing a massage effect.

Therefore, how to use fluid to provide an undulating pulsation effect and enhance the pulsation effect through the improvement of the structural design, such as a massage device, to overcome the above-mentioned problems has become one of the issues to be solved in the relevant art.

SUMMARY OF THE DISCLOSURE

In response to the above-referenced technical inadequacies, the present disclosure provides a pulsation control device that can utilize fluid to instantly increase the volume of the fluid receiving device and provide pulsation effects with different fluctuations.

In order to solve the above-mentioned problems, one of the technical aspects adopted by the present disclosure is to provide a pulsation control device, which includes a fluid supply module, a switching unit, a first path, a second path, and a fluid receiving device. The fluid supply module outputs fluid according to a predetermined pressure and a flow pulsation signal. The switching unit takes the form of a switch. The first path is connected between the fluid supply module and the switching unit. One end of the second path is connected to the switching unit. The fluid receiving device is connected to the other end of the second path, and the switching unit is located between the first path and the second path. The fluid receiving device can receive the fluid output from the fluid supply module through the switching unit. The switching unit is connected to the first path and the second path to control opening or closing of the first path and the second path. When the gas output by the fluid supply module is supplied to the first path to pressurize the gas volume of the first path, the pressurized gas volume is instantly released to the fluid receiving device through the second path. The volume of the fluid receiving device causes a change in the volume within the fluid receiving device.

Therefore, in the pulsation control device provided by the present disclosure, when the gas output by the fluid supply module is supplied to the first path to pressurize the gas volume of the first path, the switching unit is turned on to pressurize the gas. The final gas volume can be instantly released to the fluid receiving device through the second path, so that the volume in the fluid receiving device changes instantaneously to produce a percussion and pressing effect similar to that of a massage.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
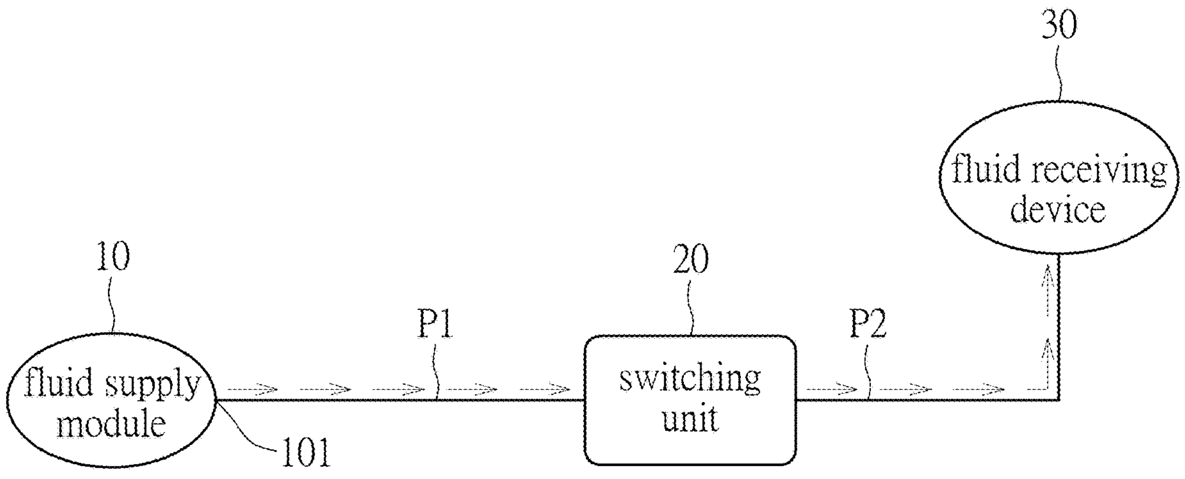
FIG. 1 is a schematic view of a pulsation control device according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as “first,” “second” or “third” can be used to describe various components, signals or the like, which are for distinguishing one component/signal from another one only, and are not intended to, nor should be construed to impose any substantive limitations on the components, signals or the like.

First Embodiment

Referring to FIG. 1, the present disclosure provides a pulsation control device, which includes a fluid supply module 10, a first path P1, a switching unit 20, a second path P2, and at least one fluid receiving device 30. The fluid supply module 10 outputs a fluid according to a pulsation signal having a predetermined pressure and a flow rate. The first path is connected between the fluid supply module 10 and the switching unit 20. The second path P2 is connected between the switching unit 20 and the fluid receiving device 30.

Specifically, in this embodiment, the fluid supply module 10 can be a pump to supply gas. The pump has an inlet end and an outlet end 101. The inlet end is connected to a supply source of gas or liquid, which could be the atmosphere or a fluid container (not shown). The first path P1 is connected to the outlet end 101 of the fluid supply module 10.

The first path P1 can be a hollow tube. One end of the hollow tube is connected to the fluid supply module 10, and the other end of the hollow tube is connected to the switching unit 20.

The switching unit 20 has the form of a switch, but it is not limited thereto. The switching unit 20 is connected to the first path P1 and the second path P2 to control an open state or a closed state between the first path P1 and the second path P2. In this embodiment, the switching unit 20 can be a solenoid valve, or an electromagnet, which can control the switching unit 20 to turn on or off through electricity. Alternatively, the switching unit 20 can also be a motor-controlled distribution valve, which can control the fluid to be opened or closed by a motor, as well as the flow direction. The switching unit 20 can also be a piezoelectric valve, which can provide more precise control.

The second path P2 may be a hollow tube, one end of the hollow tube is connected to the switching unit 20, and the other end of the hollow tube is connected to the fluid receiving device 30.

The fluid receiving device 30 is connected to the other end of the second path P2. The fluid receiving device 30 can receive the fluid output by the fluid supply module 10 through the switching unit 20. The fluid receiving device 30 may be an inflatable device with an expandable or contractible volume, such as an air bag, or an air pocket . . . etc.

When the gas output by the fluid supply module 10 is supplied to the first path P1 to pressurize the gas volume of the first path P1, the switching unit 20 is opened so that the pressurized gas volume can be released instantly through the second path P2 to the fluid receiving device 30. Therefore, the volume in the fluid receiving device 30 changes instantaneously to produce a percussion and pressing effect similar to that of a massage.

In this way, the pulsation control device of the present disclosure can instantly control the fluid receiving device 30 to produce cyclic movements of expansion and contraction in a very short period of time, for example, 10 cyclic movements in 1 second, or 50 cyclic movements in 10 seconds. Through instantaneous repeated cycles of expansion and contraction, a user of the pulsation control device can feel an effect of pulse massage. The pulsation control device of the present disclosure, for example, can be used as a seat massage device for transportation devices.

Second Embodiment

Figure 2:
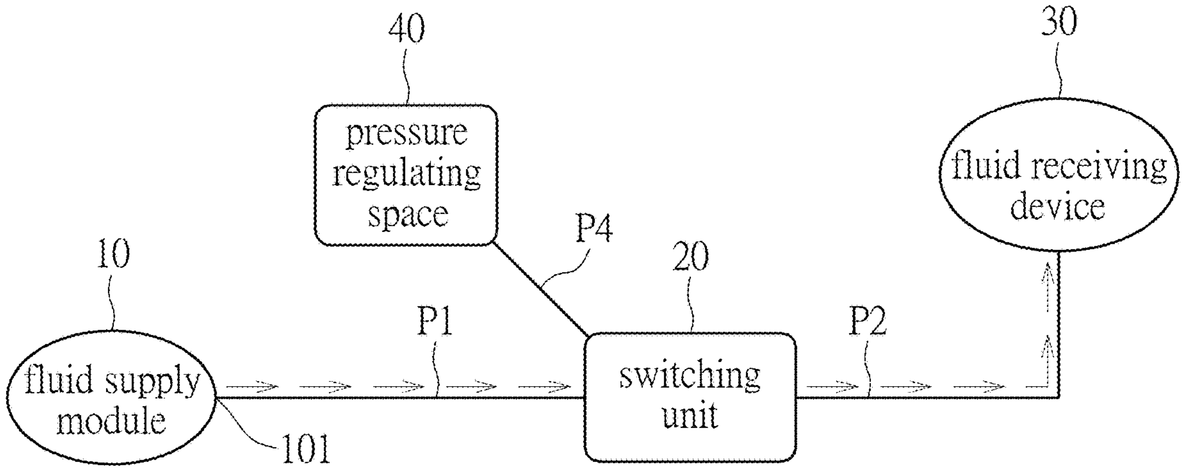
FIG. 2 is a schematic view of a pulsation control device according to a second embodiment of the present disclosure.

Referring to FIG. 2, compared with the first embodiment, the pulsation control device of the present disclosure can further include a pressure regulating space 40 as an additional boosting function. The pressure regulating space 40 is connected to the switching unit 20. The fluid volume in the pressure regulating space 40 can be transmitted to the switching unit 20 after being pressurized. When the switching unit 20 is turned on, the pressurized fluid volume in the pressure regulating space 40 is transmitted to the fluid receiving device 30 through the second path P2. Therefore, the volume of the fluid receiving device 30 can be expanded to provide another function of adjusting pressure, so as to produce an effect of increasing force during massage.

Third Embodiment

Figure 3:
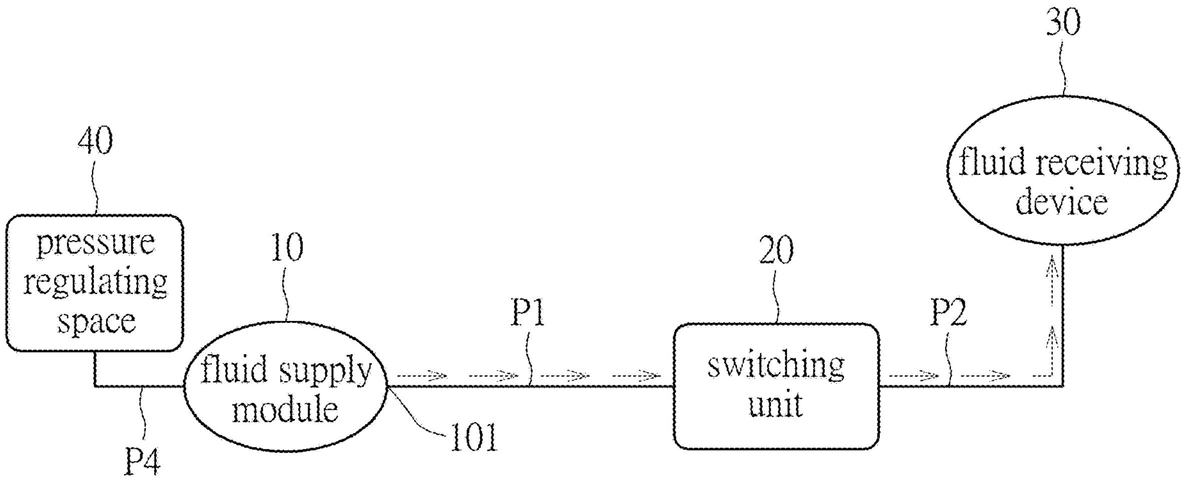
FIG. 3 is a schematic view of a pulsation control device according to a third embodiment of the present disclosure.

Referring to FIG. 3, compared with the first embodiment, the pulsation control device of this embodiment can further include a pressure regulating space 40 as an additional pressurization function. The difference from the second embodiment is that the regulating space 40 can be directly connected to the fluid supply module 10. After the fluid volume in the pressure regulation space 40 is pressurized, it can be transmitted to the switching unit 20 through the first path P1. When the switching unit 20 is turned on, the pressurized fluid volume of the pressure regulation space 40 can be transmitted to the fluid receiving device 30 through the second path P2. Therefore, the volume of the fluid receiving device 30 can be expanded, so as to provide another pressure-regulating effect to produce an increase in force during massage.

Fourth Embodiment

Figure 4:
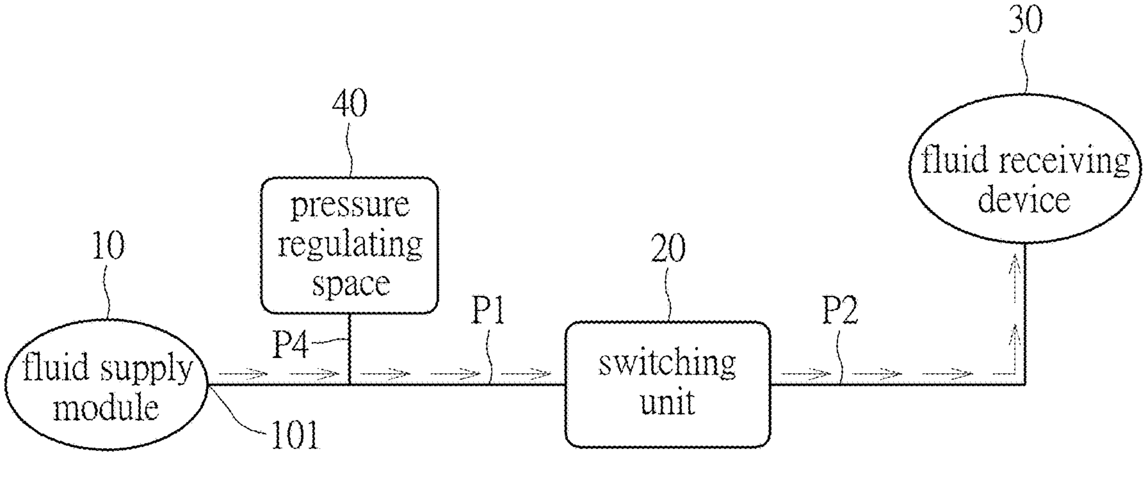
FIG. 4 is a schematic view of a pulsation control device according to a fourth embodiment of the present disclosure.

Referring to FIG. 4, compared with the first embodiment, the pulsation control device of this embodiment can further include a pressure regulating space 40 as an additional pressurization function. The difference from the second embodiment is that the pressure regulating space 40 is connected to the first path P1. The fluid volume in the pressure regulating space 40 is pressurized and can be transmitted to the switching unit 20 through the first path P1. When the switching unit 20 is turned on, the pressurized fluid volume in the pressure regulating space 40 can then be transmitted to the fluid receiving device 30 through the second path P2, and the volume of the fluid receiving device 30 can expand to provide another effect of adjusting pressure, so as to produce an effect of increasing force during massage.

Fifth Embodiment

Figure 5:
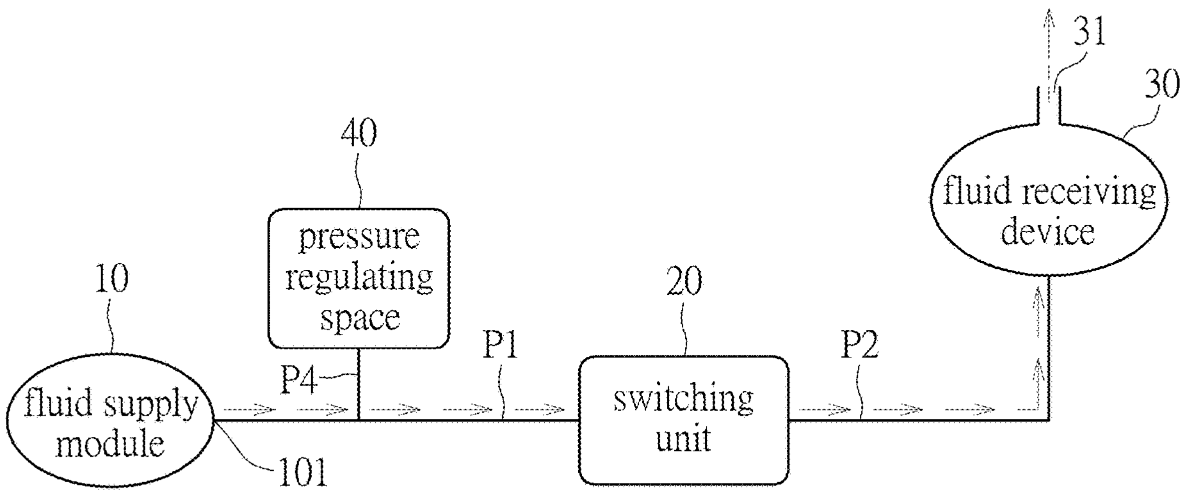
FIG. 5 is a schematic view of a pulsation control device according to a fifth embodiment of the present disclosure.

Referring to FIG. 5, in this embodiment, the pulsation control device can release fluid through pressure relief, so that the volume of the fluid receiving device 30 can shrink. In other words, the fluid receiving device 30 becomes smaller. Specifically, the fluid receiving device 30 is configured to have a first outlet 31, and the first outlet 31 is connected to the atmosphere, so as to release the fluid volume into the atmosphere through the first outlet 31. Therefore, the volume of the fluid receiving device 30 can be shrunk to produce a massage process like an effect of force release.

Sixth Embodiment

Figure 6:
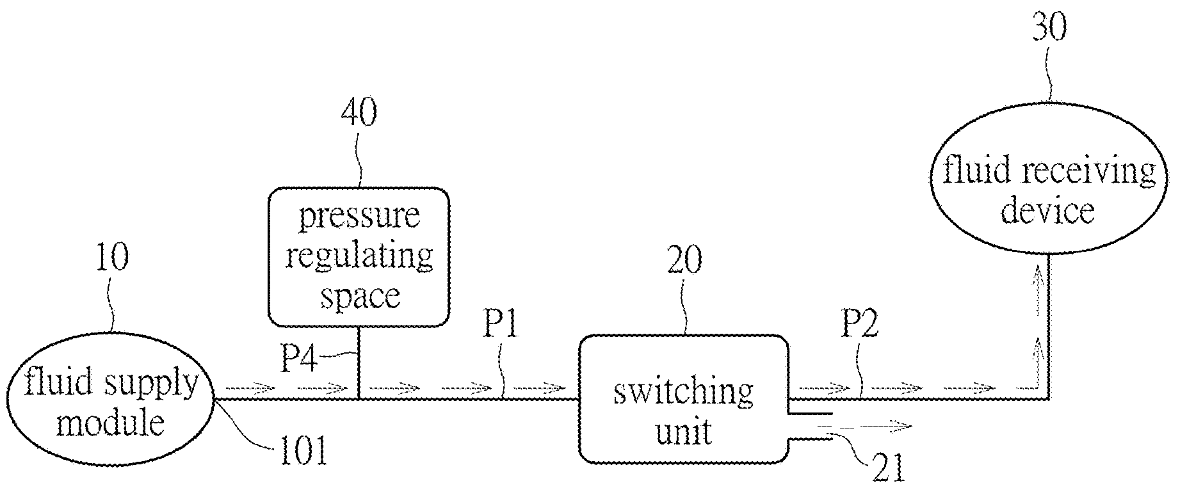
FIG. 6 is a schematic view of a pulsation control device according to a sixth embodiment of the present disclosure.

Referring to FIG. 6, the pulsation control device of this embodiment can release fluid through pressure relief, so that the volume of the fluid receiving device 30 can shrink, that is, become smaller. Specifically, the switching unit 20 is provided with a second outlet 21 that is connected to the atmosphere, so as to release the fluid volume into the atmosphere through the second outlet 21. Therefore, the volume of the fluid receiving device 30 can be shrunk to produce an effect of relaxation of force during a massage process.

Seventh Embodiment

Figure 7:
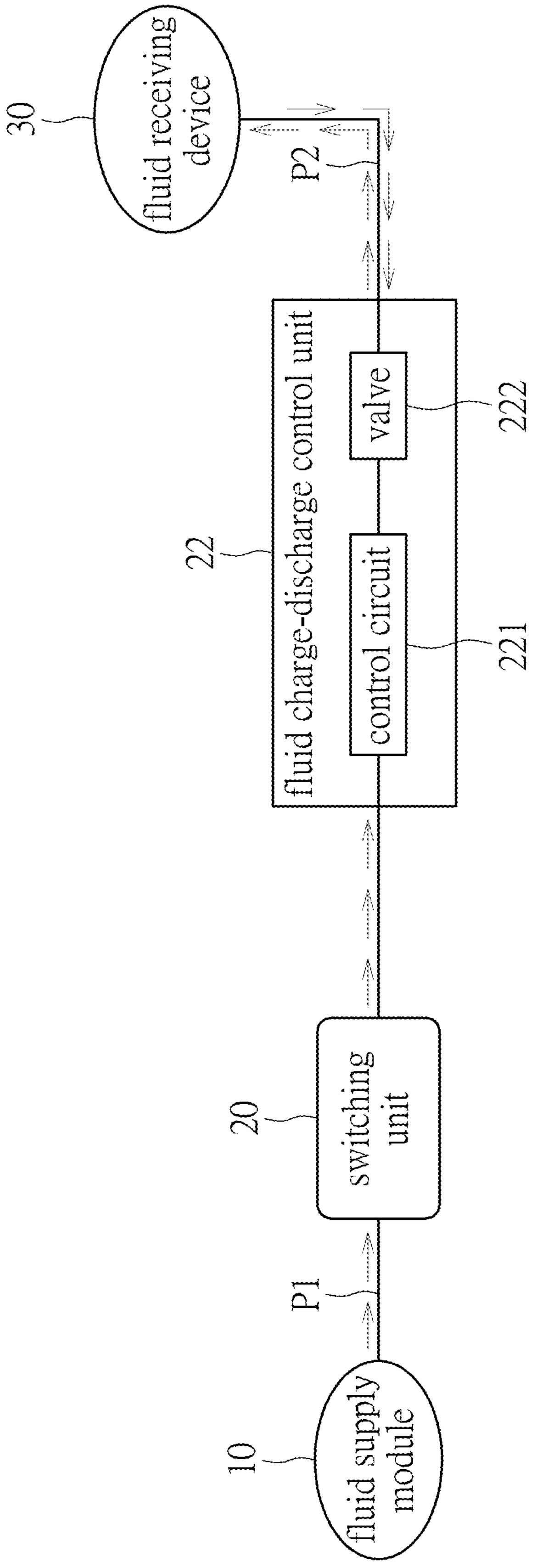
FIG. 7 is a schematic view of a pulsation control device according to a seventh embodiment of the present disclosure.

Referring to FIG. 7, the pulsation control device of the present disclosure also includes a fluid charge-discharge control unit 22. The fluid charge-discharge control unit 22 is configured to be between the switching unit 20 and the fluid receiving device 30. More specifically, the fluid charge-discharge control unit 22 is an electrical control unit (e.g., an Electronic Control Unit, ECU) controller, which can be applied to vehicles. The fluid charge-discharge control unit 22 includes at least one control circuit 221 and at least one valve 222 with a switching function. The valve 222 of this embodiment can be any product having a form of the valve with a switching function. The control circuit 221 can be a microcontroller (MCU). More specifically, the control circuit 221 can integrate a central processing unit (CPU), a memory, an input/output interface, a timer/counter (timer/counter) on a semiconductor circuit board. The control circuit 221 controls a plurality of valves 222 with switching functions. Each valve 222 can control at least one fluid receiving device 30, such as a vehicle airbag on the vehicle. Such arrangement can provide a user input/output interface to control the pulsation control device of this embodiment, such as the operating time of the seat massage equipment on the vehicle, the pulse massage intensity, etc.

Figure 8:
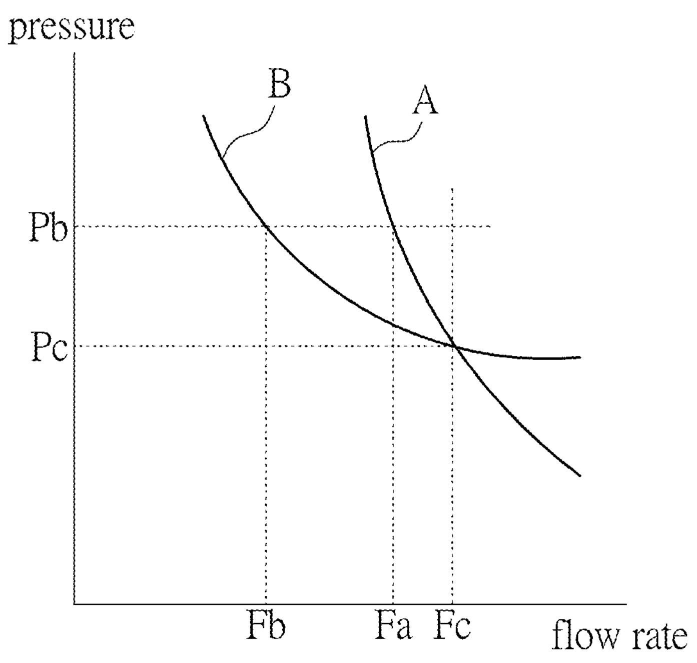
FIG. 8 is a pulsation curve diagram of a pulsation control device according to the present disclosure.

According to the above-mentioned pulsation control device, the present disclosure provides the operation steps of the pulsation control device which are described as follows. A pulsation signal with a predetermined pressure and flow rate is provided to the fluid supply module 10, and the fluid supply module 10 outputs a fluid according to the predetermined pressure of the pulsation signal. Specifically, as shown in FIG. 8, the predetermined pressure and flow pulsation signals are controlling values generated according to a pulsation curve of pressure and corresponding volume. The pulsation curve can have different predetermined curve, such as a curve A, or a curve B, so that a predetermined flow rate Fa or flow rate Fb corresponding to the same pressure Pb can be obtained and transmitted to the fluid supply module 10. Therefore, different fluid volumes can be provided to the fluid receiving device, to form instantaneous expansion effects of different sizes, and provide function like different massage effects. The curve A and curve B can have the same predetermined flow rate Fc at the same pressure Pc. The pulsation curve can be set in the electronic control unit C. Specifically, the pulsation curve can be stored in a memory. Further, the user can select different pulsation curves corresponding to different massage modes through a human-machine interface.

A switching unit 20 having the form of a switch is provided. A first path P1 is provided to connect the switching unit 20 and the fluid supply module 10. A second path P2 is provided, and one end of the second path P2 is connected to the switching unit 20.

The fluid receiving device 30 is connected to the other end of the second path P2. The switching unit 20 is located between the first path P1 and the second path P2. The fluid receiving device 30 can receive the fluid output by the fluid supply module 10 through the switching unit 20.

The switching unit 20 is used to close the connection state between the first path P1 and the second path P2.

The switching unit 20 is opened to connect the first path P1 and the second path P2 so as to instantly release the pressurized fluid volume to the fluid receiving device 30 through the second path P2. Thus, the volume in the fluid receiving device 30 changes.

In summary, through the pulsation control device of the present disclosure, when the gas output by the fluid supply module 10 is supplied to the first path P1 to increase the gas volume of the first path P1, the switching unit 20 is opened, so that the pressurized gas volume can be instantly released to the fluid receiving device 30 through the second path P2. Therefore, the volume in the fluid receiving device 30 changes instantaneously to produce a tapping and pressing effect similar to a massage.

BENEFICIAL EFFECTS OF THE EMBODIMENTS

In conclusion, the pulsation control device of the present disclosure can instantly control the fluid receiving device 30 to produce cyclic movements of expansion and contraction within very short periods of time. For example, it can produce 10 cyclic movements in 1 second, or 50 cyclic movements in 10 seconds. Through instantaneous repeated cycles of expansion and contraction pulses, the user can feel a percussion effect similar to a pulse massage. In addition, the pulsation control device can be widely used as a massage equipment in the seat of a transportation vehicle.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A pulsation control device, comprising:

a fluid supply module configured to output a fluid according to a predetermined pressure and flow pulsation signal;

a fluid receiving device configured to receive the fluid output by the fluid supply module;

a switching unit arranged between the fluid supply module and the fluid receiving device;

a first path connected between the fluid supply module and the switching unit;

a second path connected between the switching unit and the fluid receiving device;

wherein the switching unit is configured to control an open state or a closed state between the first path and the second path;

wherein, when the switching unit is in the open state, a gas outputted from the fluid supply module is supplied to the first path to pressurize a gas volume of the first path, the pressurized gas volume is released to the fluid receiving device through the second path, so that a volume within the fluid receiving device is changed; and a pressure regulating accommodation connected to the first path through a fourth path between the fluid supply module and the switching unit to provide a pressure regulating space for additionally receiving the fluid, wherein, when the fluid supply module is turned on, the fluid volume in the pressure regulating space is pressurized for an additional pressurization;

wherein, when the switching unit is turned on, the pressurized fluid volume in the pressure regulating space is transmitted to the switching unit, and the fluid in the second path is boosted to the fluid receiving device, the volume of the fluid receiving device is expanded to provide an effect of adjusting pressure, so as to produce an effect of increasing force during massage.

2. The pulsation control device according to claim 1, wherein the fluid supply module is a pump, and the fluid receiving device is an air bag.

3. The pulsation control device according to claim 1, wherein the switching unit is a solenoid valve, a solenoid, a motor-controlled distribution valve, or a piezoelectric valve.

4. The pulsation control device according to claim 1, further comprising a fluid charge-discharge control unit, wherein the fluid charge-discharge control unit is disposed between the switching unit and the fluid receiving device.

5. The pulsation control device according to claim 4, wherein the fluid charge-discharge control unit is an electrical control unit, and the fluid charge-discharge control unit includes at least one control circuit and at least one valve with switching function.

6. The pulsation control device according to claim 1, wherein the fluid receiving device has a first outlet, and the first outlet is connected to an atmosphere so as to release a gas in the fluid volume into the atmosphere through the first outlet.

7. The pulsation control device according to claim 1, wherein the switching unit is provided with a second outlet, and the second outlet is connected to an atmosphere to release a gas in the fluid volume into the atmosphere through the second outlet.

* * * * *